US012453465B2

(12) United States Patent
McIntyre et al.

(10) Patent No.: US 12,453,465 B2
(45) Date of Patent: Oct. 28, 2025

(54) WIGGLEGRAM CAMERA SYSTEM FOR USE WITH RETRACTORS

(71) Applicant: Viseon, Inc., Irvine, CA (US)

(72) Inventors: Todd D. McIntyre, Irvine, CA (US); Peter G. Davis, Irvine, CA (US)

(73) Assignee: Viseon, Inc., Irvine, CA (US)

( * ) Notice: Subject to any disclaimer, the term of this patent is extended or adjusted under 35 U.S.C. 154(b) by 0 days.

(21) Appl. No.: 19/109,738

(22) PCT Filed: Sep. 8, 2023

(86) PCT No.: PCT/US2023/032361
§ 371 (c)(1),
(2) Date: Mar. 7, 2025

(87) PCT Pub. No.: WO2024/054670
PCT Pub. Date: Mar. 14, 2024

(65) Prior Publication Data
US 2025/0255469 A1    Aug. 14, 2025

Related U.S. Application Data

(60) Provisional application No. 63/404,920, filed on Sep. 8, 2022.

(51) Int. Cl.
*A61B 17/02* (2006.01)
*A61B 1/00* (2006.01)
*A61B 1/04* (2006.01)
*A61B 1/045* (2006.01)
*A61B 1/32* (2006.01)

(52) U.S. Cl.
CPC ........... *A61B 1/042* (2013.01); *A61B 1/0005* (2013.01); *A61B 1/00183* (2013.01); *A61B 1/00193* (2013.01); *A61B 1/045* (2013.01); *A61B 1/32* (2013.01); *A61B 17/0218* (2013.01)

(58) Field of Classification Search
CPC ......... A61B 1/32; A61B 17/02; A61B 17/025; A61B 17/0206; A61B 17/0218; A61B 2017/0256–0262
See application file for complete search history.

(56) References Cited

U.S. PATENT DOCUMENTS

| 10,555,666 B2 * | 2/2020 | Davis | A61B 17/3423 |
| 11,723,641 B2 * | 8/2023 | McIntyre | A61B 17/0206 600/204 |

(Continued)

OTHER PUBLICATIONS

International Search Report and Written Opinion dated Sep. 8, 2023 from IA PCT/US2023/032361.

Primary Examiner — Eduardo C Robert
Assistant Examiner — Michelle C Green
(74) Attorney, Agent, or Firm — Crockett & Crockett, PC; K. David Crockett, Esq.

(57) ABSTRACT

A camera system for use with retractors. The system includes a camera assembly configured for mounting on the proximal end of a retractor system. The camera assembly viewing axis may be translated between a first and second position to obtain a stereographic image pair, and a control system is operable to control the camera assembly and an associated display to present the stereographic image pair as a wigglegram which conveys 3D information to the user.

8 Claims, 5 Drawing Sheets

(56) References Cited

U.S. PATENT DOCUMENTS

| | | | |
|---|---|---|---|
| 2015/0141755 A1* | 5/2015 | Tesar | A61B 1/051 600/109 |
| 2018/0070804 A1 | 3/2018 | Tesar et al. | |
| 2019/0307439 A1* | 10/2019 | Chhit | A61B 17/0206 |
| 2022/0110659 A1* | 4/2022 | Flower | A61B 17/66 |
| 2022/0225868 A1 | 7/2022 | Davis et al. | |

\* cited by examiner

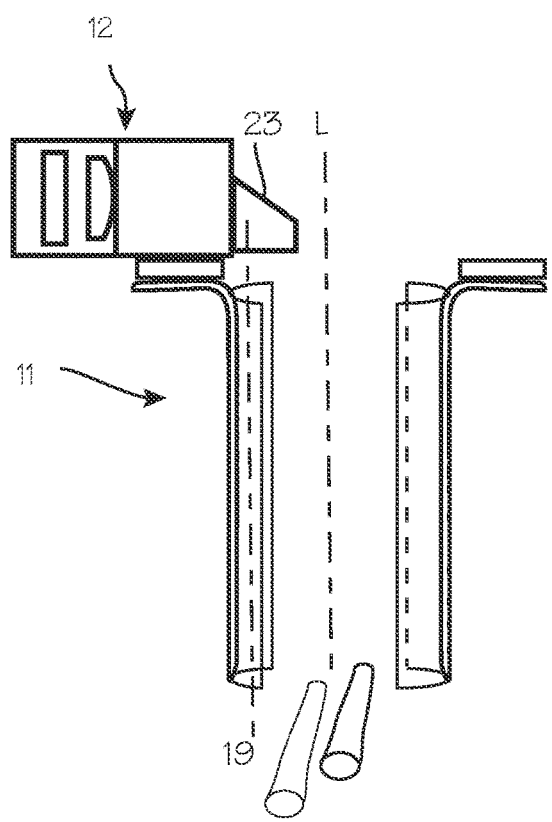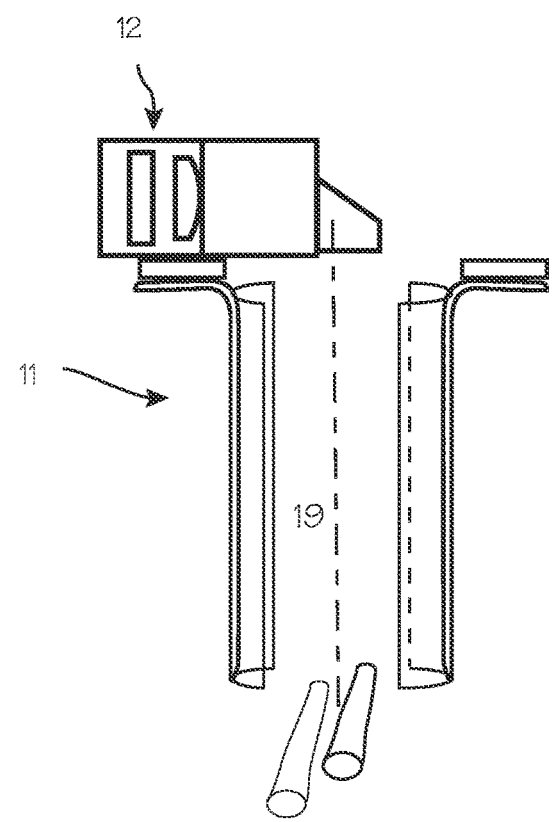

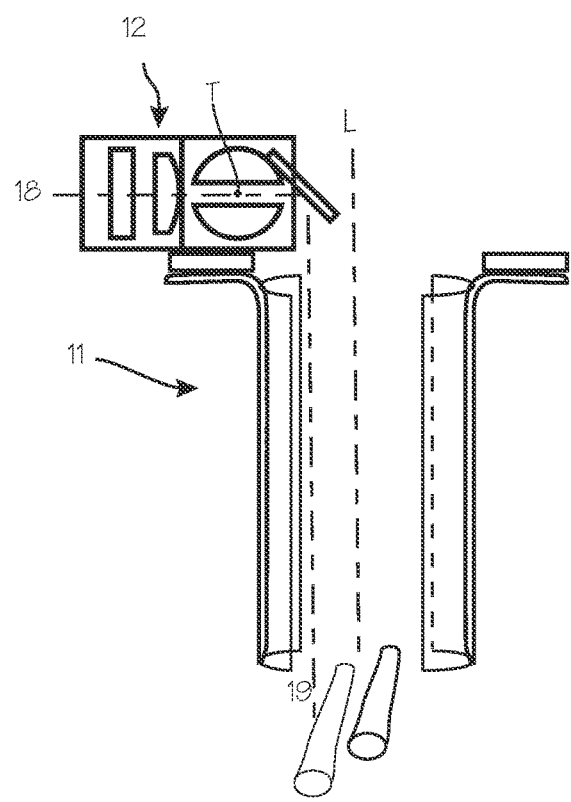
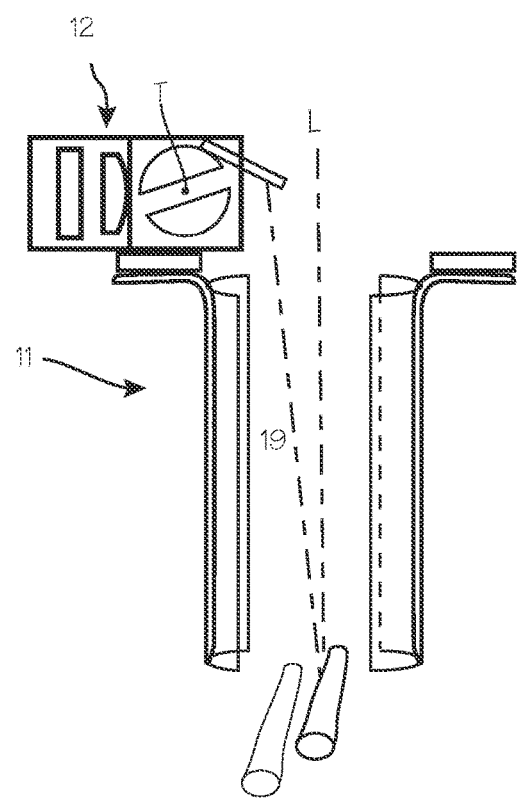

WIGGLEGRAM CAMERA SYSTEM FOR USE WITH RETRACTORS

FIELD OF THE INVENTIONS

The inventions described below relate to the field of minimally invasive surgery.

BACKGROUND OF THE INVENTIONS

Retractors with cameras mounted on components of the retractors have been used for various surgeries, including spine surgery and abdominal surgery. Tesar, U.S. Pat. No. 9,492,065 (Nov. 15, 2016) discloses a retractor for abdominal surgery, with cameras mounted on the circular frame, or blades of the retractor. Chhit, U.S. Pub. 20200261071 (Aug. 20, 2020) discloses a retractor for spinal surgery, with camera assemblies mounted on a retractor frame or a retractor blade. In each of these systems, the entire camera assembly may be rotated relative to the retractor system to point the camera to different areas of a surgical field at the distal end of the retractor blades. In our U.S. patent Ser. No. 11/723,641 (U.S. application Ser. No. 17/444,328), entitled Camera System for Use with Retractors, we disclose a camera assembly configured for mounting on the proximal end of a retractor system in which the camera assembly includes a rotatable reflector mount disposed within the camera assembly and configured to rotate a reflecting element to direct images from the surgical working channel to the image sensor. The reflector mount and reflector may be rotated to point the viewing axis of the system toward different points in the surgical field at the distal end of the retractor. These systems can be enhanced with the provision of 3D imaging with images provided in a 2D display screen, a 3D display or a 3D head mounted display.

SUMMARY

The devices and methods described below provide for improved visualization of a surgical work space held open with a retractor and effective 3D display of images obtained from a camera assembly configured for mounting on the proximal end of a retractor system, where the camera assembly includes a distal-most optical surface which, in the preferred embodiment, is disposed at the proximal end of the cannula system such that the entirety of the camera assembly is disposed at the proximal end of the retractor system. The distal-most optical element in the camera assembly may be disposed at the proximal end of the retractor system, and may be disposed proximal to the proximal end of the retracting element (blade or cannula tube), and may be disposed such that the distal-most optical element overhangs the working channel established by the retractor. The camera assembly includes a reflector mounted on a rotatable reflector mount, and mechanisms to rapidly move the reflector back and forth between at least two different positions to obtain at least two different views of the surgical space, and a control system operable to operate the camera system and a display screen to obtain alternating images from the different view points, process the images and present the images from the different viewpoints alternatingly on a display screen.

The alternating nature of the display can be accomplished at low frame rates (as low as one alternation per second or lower) or a high frame rate, but in any case the images from the two viewpoints should be alternated at a rate sufficient to provide useful 3D images from which a surgeon operating through the retractor can discern the relative depth of anatomical structures in the surgical site. The presentation of a pair of stereoscopic images in alternating succession on a two dimensional display screen to provide a stuttering image conveying depth perception is referred to as a wigglegram. The presentation of a pair of stereoscopic images in alternating succession on individual screens of a pair of shutter glasses may also be used with the systems described below to provide 3D images conveying depth perception.

"Stereoscopic image pairs" refer to two photographs, or two sets of video images, of the same object taken at slightly different angles are viewed together, creating an impression of depth and solidity. In the systems described below that use a 2D display and shutter glasses, video images may be viewed "together" in the sense that one set of images from a first viewpoint are transmitted to a display screen visible to a user followed by a second set of images from a second viewpoint transmitted to the display placed, while the user wears shutter glasses which are transparent to the right eye but opaque to the left eye while the right-eye image is displayed, and vice-versa, at any rate that produces acceptably smooth images (which need not be cinema or broadcast quality). In systems describe below which use a 2D display and wigglegrams, "together" may mean one viewpoint image displayed immediately after the second viewpoint image, perhaps several times in succession (a single wigglegram stereoscopic pair, displayed in alternation). If implemented in a heads mounted display, "together" may mean that one set of images from a first viewpoint are transmitted to a display screen visible to one eye of the user while images from a second viewpoint are transmitted to a display screen visible to the other eye of the user.

The first mode presented below is based on wigglegrams. Wigglegrams are typically created using a camera assembly comprising two or more distinct imaging assemblies which in turn comprise at least a lens and imaging sensor. The systems described below provide wigglegram stereoscopic image pairs using a single imaging assembly.

BRIEF DESCRIPTION OF THE DRAWINGS

FIGS. 6 and 7 illustrate trucking operation of the camera assembly useful for obtaining stereographic image pairs of the surgical workspace.

FIGS. 8 and 9 illustrate tilting operation of the camera assembly useful for obtaining stereographic image pairs of the surgical workspace.

DETAILED DESCRIPTION OF THE INVENTIONS

Figure 1:
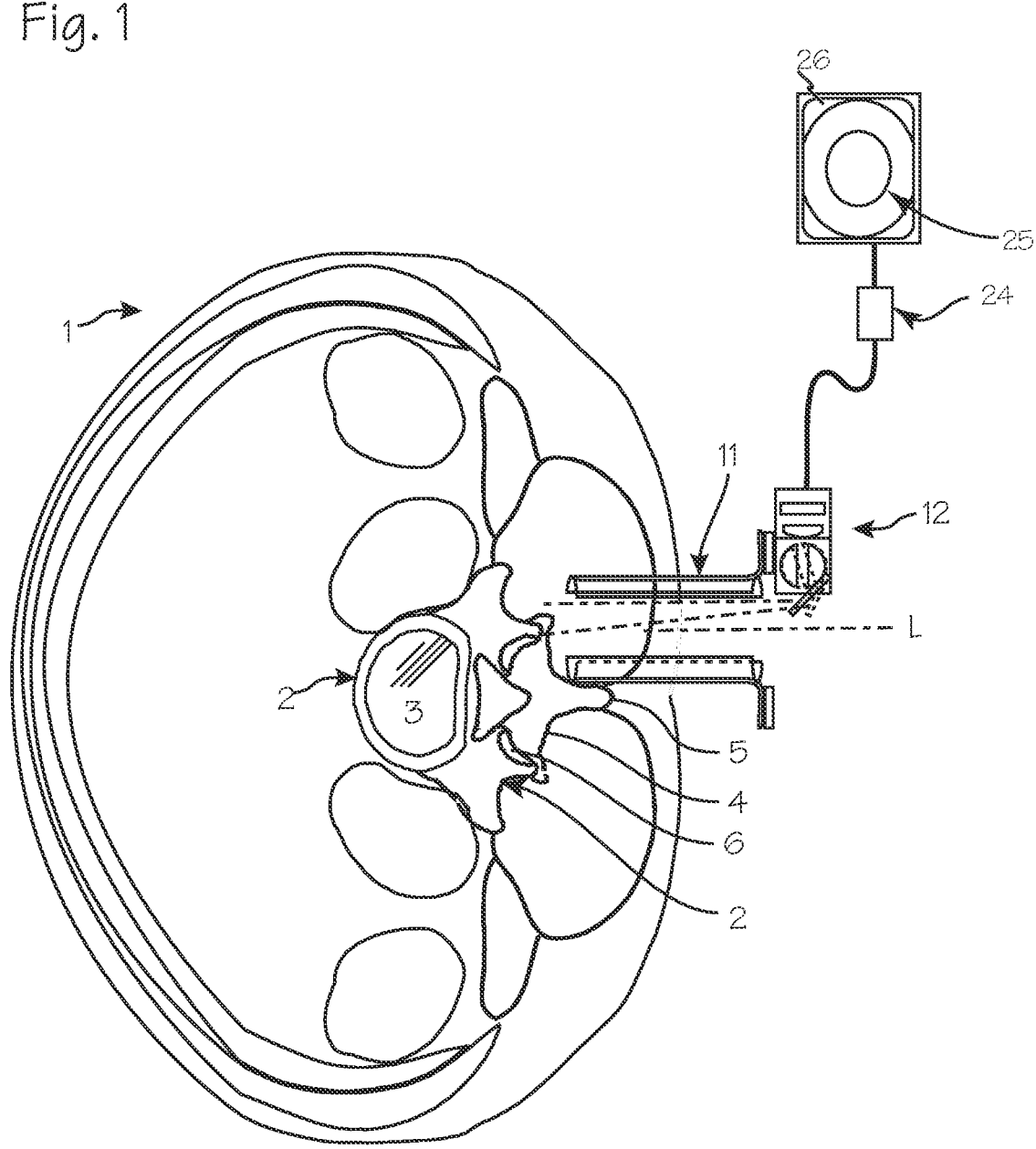
FIG. 1 is a coronal cross section of a patient illustrating a typical placement of a retractor system and camera assembly in which the rotatable mirror may be used to direct the viewing angle of the camera assembly to different areas of the surgical workspace at the distal end of the retractor blades.

FIG. 1 illustrates one environment of use of the retractor system and camera assembly, and shows a coronal cross section of a patient 1, taken through the midsection at the level of the lower back and lumbar spine, illustrating a typical placement of a retractor system and camera assembly in which the rotatable mirror may be used to direct the viewing angle of the camera assembly to different areas of the surgical workspace at the distal end of the retractor blades. The anatomy shown in FIG. 1 includes the vertebra 2, an intervertebral disc 3, lamina 4 and spinous process 5, and the articular joint 6 to an adjacent vertebra, each of which might need to be addressed surgically to treat a variety of conditions.

To gain access to any of these structures, a surgeon may approach the spine through a retractor system 11 placed in one of several pathways. For a laminotomy or laminectomy, for example, the retractor will be placed posteriorly to the spine, and inserted into an incision in the back. If the retractor is an expandable multi-blade retractor, the surgeon will separate the blades to create a large working channel. If the retractor is a cannula retractor or trocar, the lumen of the cannula will serve as the working channel. The working channel also serves as a viewing channel, such that the surgeon can view the surgical workspace through the same path used to insert tools into the surgical space.

In addition to bone structures of the spine, the surgical field may include arteries, veins, nerves and ligaments which may need to be avoided, manipulated, retracted, cauterized, etc. A 3D image that conveys information regarding the relative depth of these structures can facilitate proper access to or avoidance of each of these structures.

To provide viewing of the surgical workspace, the camera assembly 12 may be fixed to the proximal end of the retractor. The camera assembly may be fixed to a retractor blade of an expandable retractor or to the proximal end of a tube of a cannula retractor, or to the frame of a multi-blade retractor, or to the proximal end of a single blade retractor, or other retracting element.

Figure 2:
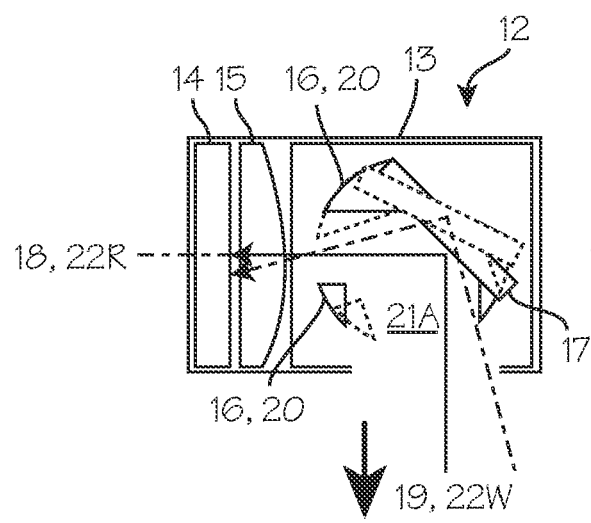
FIGS. 2 and 3 illustrate camera assemblies configured for adjustment of the viewing axis of the camera assembly.
Figure 2:
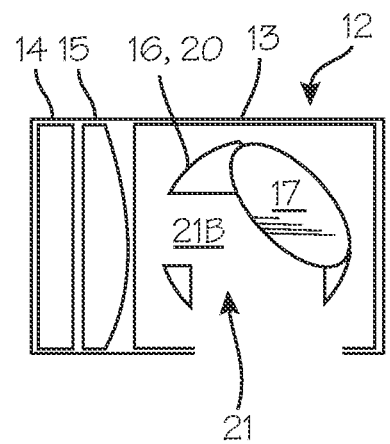
Figure 3:
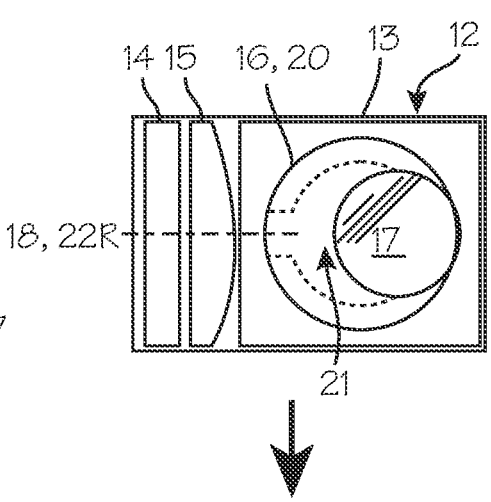
Figure 3:
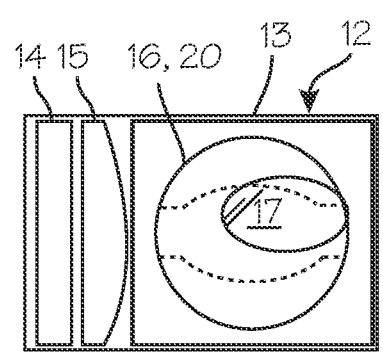

FIGS. 2 and 3 illustrate a camera assembly configured for adjustment of the viewing axis of the camera assembly by rotating a reflector without rotation or translation of the entire camera assembly, and without movement of the imaging sensor within the camera assembly. As shown in FIG. 2, the camera assembly 12 comprises a housing 13 with an imaging sensor 14 disposed at a first end of the housing, a lens assembly 15, a rotatable reflector mount 16 and a reflector 17 mounted on the reflector mount at the second end of the housing. The rotatable reflector mount is disposed between the imaging sensor and the reflector, and is rotatably disposed within the housing such that it can tilt the mirror in planes intersecting the central viewing axis 18 of the imaging sensor (typically perpendicular to the flat face of the imaging sensor). The reflector mount, when comprising an element disposed between the reflector and imaging sensor, is optically transmissive, such that light beams from the surgical workspace and reflected by the mirror will pass through the reflector mount to the lens 15 and imaging sensor 14. The reflector establishes a central viewing axis 19 of the camera assembly, and the rotatable reflector mount provides a means for rotating the mirror and thereby altering the viewing axis relative to the imaging axis of the sensor to provide views of the surgical workspace at the distal end of the retractor blades or retractor tube, without need to rotate the entire camera assembly. The reflector may be the distal-most optical component, but may be covered with a lens, protective transparent plate or filter or other optical component which serves as the distal-most optical component. Such a lens, protective transparent plate or filter or other optical component which serves as the distal-most optical component may be disposes at the objective aperture of the bore of the rotatable reflector mount or an optical opening of the camera assembly. The distal-most optical component (or surface thereof) preferably is disposed, when the camera assembly is fixed to a retractor, at the proximal end of the working channel established by the retractor blades, or proximal to, and overhanging without occluding the working channel established by the retractor blades.

The rotatable reflector mount 16 of FIGS. 2 and 3 may be provided in the form shown, with a generally spherical body 20 (a ball head, for example), or a body comprising a portion of a sphere, with a bore 21 with a first segment 21A passing through the body along a line 22W between the workspace and the reflector and a second segment 21B passing through the body along the line 22R of light reflected by the reflector toward the image sensor (the reflector reflection axis). The bore segments establish optical apertures in the spherical body 20, including an aperture closest to the surgical workspace (an objective aperture) and an aperture closest in the optical pathway to the image sensor (an ocular aperture). The bores may be open, empty bores, or they may be filled with optically transmissive or transparent material (if so, the surface of any transmissive material in the objective aperture may constitute a distal-most surface of the camera assembly). The spherical body may be truncated, as shown, to provide a flat surface at the objective aperture, and truncated to establish a flat surface along a cord set at an angle to the reflector reflection axis. In this geometry, the truncated flat surface along the cord corresponds to the flat plane of the reflector, and is set at a 45' angle to both the axis of the bore first segment 21A and the second bore segment 21B when the spherical body 20 is in a neutral position. This angle may be varied to accommodate retractors of various configuration, to avoid interference with other structures on the retractor. The reflector, or the aperture closest to the surgical workspace (an objective aperture) in the reflector mount/spherical body, or an optical element disposed with the aperture may be the distal-most optical element, or the optical element closest to the objective, and preferably is disposed proximal to the proximal end of the retractor elements, or the working channel defined by the retractor elements.

Figure 4:
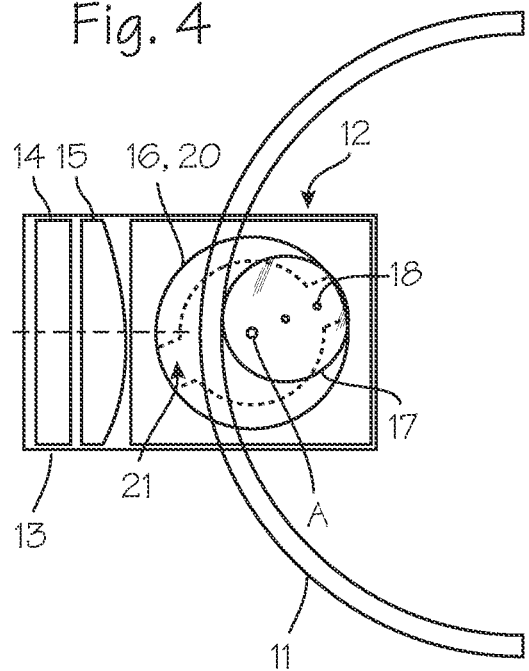
FIGS. 4 and 5 illustrate swiveling operation of the camera assembly useful for obtaining stereographic image pairs of the surgical workspace.
Figure 5:
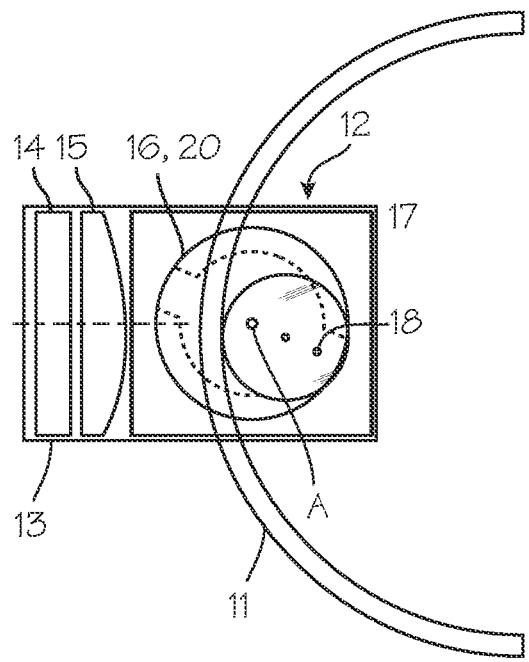

FIGS. 4 and 5 illustrate an operation of the camera system to obtain varying images of the same surgical workspace in alternating fashion to provide stereoscopic image pairs which can be processed into wigglegrams providing depth of field information on a 2D display screen. In FIGS. 4 and 5, the reflector mount 16 and reflector 17 are rolled or swiveled about an axis A parallel to the long axis L of the retractor system 11 (which may be the center of the ball, or an edge nearer the image sensor). (We define this movement of the reflector and reflector mount as swiveling or yawing if accomplished about any axis parallel to the viewing axis (the center of the reflector mount, or closer to the image sensor), and "rolling" if limited to rotation about the imaging axis 18). Preferably, this motion is a swiveling motion about the center of the reflector mount, which results in small "lateral" movement of the viewing axis. The first position of the reflector mount and reflector shown in FIG. 4 places the viewing axis in a first location a short distance from the second position of the reflector mount and reflector shown in FIG. 5, in which the second viewing axis position achieved when swiveled as shown in FIG. 5 is displaced from the first position.

In FIGS. 6 and 7, the camera assembly is provided in configuration a which uses an imaging sensor 14, lens assembly 15 and fixed reflector (preferable a prism) 23 mounted on the proximal end of the retractor, with the prism comprising the distal-most optical surface of the camera assembly. In this embodiment, the camera assembly components are translated across the opening of the retractor system (note that the entire camera assembly may be translated inwardly and outwardly). In FIG. 6, the camera assembly including the prism is configured and positioned to point the viewing axis 19 of the camera assembly to a first point in the surgical workspace nearer the retractor wall, while in FIG. 7 the camera assembly including the prism are positioned to point the viewing axis 19 of the camera assembly to a second point further away from the wall of the retractor blade or tube. The camera assembly and prism are operable to be translated inwardly toward the center to the surgical channel, and back outwardly toward the edge of the surgical channel. (We define this motion as trucking or pedestalling, analogous to similar movements of film cameras relative to a film set.)

FIGS. 8 and 9 illustrate operation of the camera system to obtain varying images of the same surgical workspace in alternating fashion to provide stereoscopic image pairs which can be processed into wigglegrams providing depth of field information on a 2D display screen. In FIG. 8, the reflector mount 16 and reflector 17 are positioned to point the viewing axis 19 of the camera assembly to a first point in the surgical workspace, while in FIG. 9 the reflector mount 16 and reflector 17 are positioned to point the viewing axis 19 of the camera assembly to a second point in the surgical workspace. The reflector mount 16 and reflector 17 have been rotated about a transverse axis T (orthogonal to the long axis L and the imaging axis 18) (We can define this tilting toward and away from the retract wall nearest the camera mount, and rotation about axis T as tilting or pitching.)

Thus, in FIGS. 2 through 9, we present various configurations of a camera and retractor system operable to obtain stereographic image pairs useful to create wigglegrams to be used in various visualization methods described below.

The camera assembly may be operated in a normal, standard video camera mode, obtaining video images in standard format at standard refresh rates or frame rates, with the viewing axis in a position which may be deemed the first position. The camera may be operated through a control system 24, to obtain images from the camera and process images and operate the display 25 to display images 26 on a screen. When 3D information is desired, an operator may operate the control system which is operable to cause the reflector mount to move the viewing axis to the second position and obtain at least one video frame from the second position. The camera assembly can be manipulated so that the viewing axis is returned to the first position or the viewing axis may be maintained in the second position. The camera assembly may be manipulated by hand (for example, with a lever operable connected to the reflector mount and external to the camera housing) from the first position to the second position and back again, or may be moved back and forth with a motor or solenoid actuator (or other means for rotating or translating) operably connected to the reflector mount, or other means for rotating the reflector mount relative to one of its several axes. With the camera viewing axis pointed in the first direction, toward the first point, the camera is operated, through a control system, to obtain an image (still image or short video clip comprising a few frames of video). The different obtained images may be compared and key-stoned and trimmed for transmission to the display screen to display stereoscopic image pairs of the same area of the surgical workspace that are at least roughly aligned on the display screen.

The associated control system is operable to obtain both (1) normal 2D video images from the camera while it is maintained in the viewing axis single direction, and control the display screen to display 2D corresponding video images on the 2D display screen, so that the system can be used as usual to visualize the surgical site while passing the distal end of surgical tools through the cannula and (2) stereoscopic pairs of images from the camera, with one image of the pair obtained with the camera viewing axis in a first position and the other image obtained with the camera viewing axis in a second position, and control the display to display a wigglegram of comprising corresponding stereoscopic image pairs on the 2D display screen, so that the system can be used to visualize the surgical site and discern the relative depths of structures within the surgical site.

The control system may be operated to provide occasional alternating stereographic image pairs, while otherwise presenting normal video (NTSC or HD or other standard) on the 2D display, in a portion of the display designated for video display, provided on the 2D display in a manner that replaces or interrupts the normal video, or provided in an inset (picture-in-picture) format. The control system may operate the camera assembly to obtain and display the occasional alternating stereographic image pairs upon demand, as indicated by input provided to the control system. Thus, a surgeon may operate the system, and work through the retractor, generally under the guidance of standard video images displayed on the display screen, and provide input to the control system when a 3D information is desired to cause the control system to obtain pair(s) of stereographic images and present the pair(s) of stereographic images as a wigglegram on the 2D display screen. Once the surgeon has seen the wigglegram and discerned any relative depth information conveyed by the wigglegram, the surgeon can provide input to the control system to cease display of the pair(s) of stereographic images.

The system may be operated to obtain and display a continuing series of pairs of stereoscopic images, to create a wigglegram video, if desired, for example, to guide tool tip toward a structure in the surgical workspace. To generate a video comprising multiple wigglegrams, the control system may generate a first pair, display the first pair in alternating fashion (at least one exchange to convey depth information), then generate a second pair, display the second pair in alternating fashion (at least one exchange to convey depth information), etc., generating and displaying many sequential pairs in sequence. The result will be a jittery video that nonetheless provides immediate visualization of movement of tool tips through the surgical space and anatomical structures in the surgical space along with conveyance of depth information to the surgeon.

A method of visualizing a surgical workspace of a patient from the proximal end of a retractor using the system described above can include the steps of installing the retractor in a patient to provide access to a surgical site rotating the rotatable reflector mount (1) about the imaging axis to move the viewing axis between the first position and the second position, (2) about an axis transvers to the imaging axis to move the viewing axis between the first position and the second position and/or (3) about an axis parallel to a long axis of the retractor system to move the viewing axis between the first position and the second position; obtaining an image of the surgical site from the first position and obtaining an image of the surgical site from the second position; and operating the control system to create and display a wigglegram comprising the image of the surgical site from the first position and obtaining the image of the surgical site from the second position.

The embodiments described above are configured to provide visualization conveying depth information for the surgical site using a typical operating room set-up in which a surgeon operates on a surgical site through a bladed or cannula retractor while looking at the surgical site directly through the cannula and viewing an enlarged video image of the surgical site on a display screen. The system accomplishes this goal with standard display screens without the need for complex head gear, head tracking or eye tracking. However, the operation of the camera assembly to obtain first and second images from first and second viewpoints can be combined with (1) shutter glasses and a separate display screen or (2) a head-mounted display. When used with shutter glasses, the shutters may be opened (made transparent) and closed (made opaque) in alternating fashion, while the display screen is controlled to display first and second images in alternating fashion synchronized with the opening and closing of the shutter glasses to present 3D images to a user wearing the shutter glasses, without regard to the generation of a wigglegram. This may be accomplished at a high frame rate, such as video frame rate or refresh rate of 30, 60, 120 Hz (frame per second) or other standard rate, rather that the very low frame rate of wigglegrams. When accomplished with a head mounted display, the wigglegram may be presented as described above in relation to larger 2D displays, or the stereoscopic pairs may be obtained and presented at a high frame rate (higher than the several frames per second which suffice for a wigglegram) to provide true 3D imaging with images from the first position of the viewing axis displayed in the line of sight of one eye and images from the second position of the viewing axis displayed in the line of sight of the second eye.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A camera and retractor system for access to a surgical workspace within a body of a patient, said system comprising:
   a retractor system comprising at least one retracting element operable to retract body tissue to create a surgical working channel defined by said retracting element of the retractor system for access to the surgical workspace within the body of the patient;
   a camera assembly secured to the retractor system at the proximal end of the working channel, with a portion of the camera assembly overhanging the working channel and extending into a space defined by the working channel of the at least one retracting element; wherein
   the camera assembly is characterized by a viewing axis and comprises an image sensor with an imaging sensor axis, and a first reflecting element positioned to reflect light from the working channel to the imaging sensor; and
   the camera assembly further comprises a rotatable reflector mount disposed within the camera assembly and configured to rotate the first reflecting element to direct images from the surgical working channel to the image sensor;
   a display screen; and
   a control system operable to (1) control the camera assembly to rotate the rotatable reflector mount to move the viewing axis between a first position and a second position, with the viewing axis directed toward the surgical workspace in both the first position and the second position, (2) control the camera assembly to obtain a first image of the surgical workspace when the viewing axis is in the first position and obtain a second image of the surgical workspace when the viewing axis is in the second position and (3) control the display screen to display the first image and second image in alternating fashion in a single area of the display screen;
   at a rate sufficient to provide useful 3D images on the display from which a surgeon operating through the retractor can discern the relative depth of anatomical structures in the surgical site.

2. The camera and retractor system of claim 1, wherein the control system is operable to rotate the rotatable reflector mount about the imaging axis to move the viewing axis between a first position and a second position.

3. The camera and retractor system of claim 1, wherein the control system is operable to rotate rotatable reflector mount about an axis transvers to the imaging axis to move the viewing axis between a first position and a second position.

4. The camera and retractor system of claim 1, wherein the control system is operable to rotate rotatable reflector mount about an axis parallel to a long axis of the retractor system to move the viewing axis between a first position and a second position.

5. A method of visualizing a surgical workspace of a patient from the proximal end of a retractor, said method comprising the steps of:
   providing the camera and retractor system of claim 1;
   installing the retractor in a patient to provide access to a surgical site;
   rotating the rotatable reflector mount about the imaging axis to move the viewing axis between the first position and the second position;
   obtaining an image of the surgical site with the rotatable reflector mount in the first position and obtaining an image of the surgical site with the rotatable reflector mount in the second position; and
   operating the control system to create and display a wigglegram comprising the image of the surgical site obtained with the rotatable reflector mount in the first position and obtained with the rotatable reflector mount in the image of the surgical site from the second position.

6. A method of visualizing a surgical workspace of a patient from the proximal end of a retractor, said method comprising the steps of:
   providing the camera and retractor system of claim 1;
   installing the retractor in a patient to provide access to a surgical site;
   rotating the rotatable reflector mount about an axis transvers to the imaging axis to move the viewing axis between the first position and the second position;
   obtaining an image of the surgical site with the rotatable reflector mount in the first position and obtaining an image of the surgical site with the rotatable reflector mount in the second position; and
   operating the control system to create and display a wigglegram comprising the image of the surgical site obtained with the rotatable reflector mount in the first position and obtained with the rotatable reflector mount in the image of the surgical site from the second position.

7. A method of visualizing a surgical workspace of a patient from the proximal end of a retractor, said method comprising the steps of:
providing the camera and retractor system of claim 1;
installing the retractor in a patient to provide access to a surgical site;
rotating the rotatable reflector mount about an about an axis parallel to a long axis of the retractor system to move the viewing axis between the first position and the second position;
obtaining an image of the surgical site with the rotatable reflector mount in the first position and obtaining an image of the surgical site with the rotatable reflector mount in the second position; and
operating the control system to create and display a wigglegram comprising the image of the surgical site obtained with the rotatable reflector mount in the first position and obtained with the rotatable reflector mount in the image of the surgical site from the second position.

8. A camera and retractor system for access to a surgical workspace within a body of a patient, said system comprising:
a retractor system comprising at least one retracting element operable to retract body tissue to create a surgical working channel defined by said retracting element of the retractor system for access to the surgical workspace within the body of the patient;
a camera assembly secured to the retractor system at the proximal end of the working channel, with a portion of the camera assembly overhanging the working channel and extending into a space defined by the working channel of the at least one retracting element; wherein
the camera assembly is characterized by a viewing axis and comprises an image sensor with an imaging sensor axis, and a first reflecting element positioned to reflect light from the working channel to the imaging sensor; and
the camera assembly being translatable relative to the working channel between a first position and a second position;
a display screen; and
a control system operable to (1) control the camera assembly to translate the camera assembly to move the viewing axis between the first position and the second position, with the viewing axis directed toward the surgical workspace in both the first position and the second position, (2) control the camera assembly to obtain a first image of the surgical workspace when the viewing axis is in the first position and obtain a second image of the surgical workspace when the viewing axis is in the second position and (3) control the display screen to display the first image and second image in alternating fashion in a single area of the display screen;
at a rate sufficient to provide useful 3D images on the display from which a surgeon operating through the retractor can discern the relative depth of anatomical structures in the surgical site.

* * * * *